2,838,498
Patented June 10, 1958

2,838,498

6-FLUORO-Δ⁴-3-KETO STEROIDS AND PROCESS FOR PREPARING SAME

Barney J. Magerlein, Kalamazoo, and George B. Spero, William P. Schneider, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,497

24 Claims. (Cl. 260—239.55)

This invention relates to 6-fluoro-9α-halohydrocortisone and 6-fluoro-9α-halocortisone and 21-esters thereof, to intermediates in the preparation of such compounds, and to a process for their production.

The compounds of this invention possess valuable antirheumatoid arthritic, anti-inflammatory and glucocorticoid activities in marked degree. Thus, for example, 6α,9α-difluorohydrocortisone has been found to exhibit approximately 59 times and 6α,9α-difluorohydrocortisone acetate 63 times the glucocorticoid activity of hydrocortisone. These compounds are useful in the treatment of inflammatory conditions of the skin, eyes and ears of humans and of valuable domestic animals, as well as contact dermatitis and other allergic reactions. Compositions containing the compounds of the present invention can be prepared for animal or human use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

The compounds of this invention can be prepared in accordance with the following reactions:

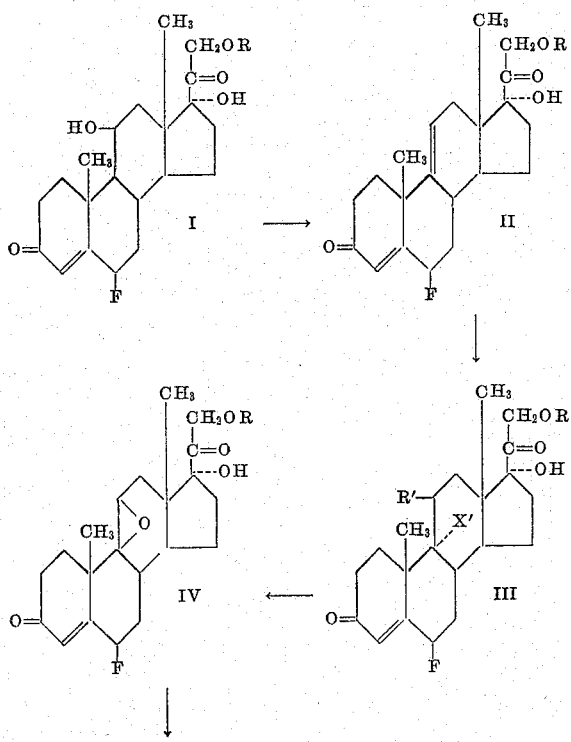

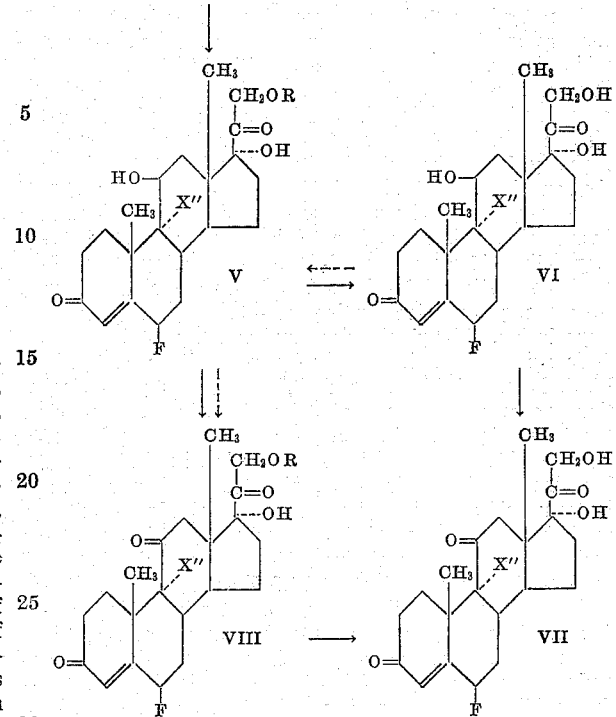

wherein R is hydrogen or the acyl radical of an organic carboxylic acid, preferably a hydrocarbon carboxylic acid containing from one to twelve carbon atoms, inclusive, X' is bromo, chloro or iodo, and X" is fluoro, chloro or bromo.

As indicated above and described in greater detail below, the sequence of reactions embodied in the process characterizing this invention is susceptible of variation, the precise order selected being determined by such factors as economics and convenience.

It is an object of the present invention to provide 6-fluoro-9α-halohydrocortisone and 6-fluoro-9α-halocortisone and 21-esters thereof. Another object of this invention is to provide 6α-fluoro-9α-halohydrocortisone and 6α-fluoro-9α-halocortisone and their 21-esters. A further object is to provide novel intermediates in the preparation of 6-fluoro-9α-halohydrocortisone and 6-fluoro-9α-halocortisone and the 21-esters of each. Still another object is the provision of processes for the preparation of 6-fluoro - 9α - halohydrocortisone and 6-fluoro-9α-halocortisone, 21-esters thereof and intermediates thereto. Additional objects will be apparent to those skilled in the art to which this invention pertains.

The process of the present invention comprises first the dehydration of 6-fluorohydrocortisone 21-acylate to obtain 6-fluoro-17α,21-dihydroxy-4,9(11)-pregnadiene-3,20-dione 21-acylate, followed by treatment of the dehydration product with a source of hypohalous acid in which the halogen is bromine, chlorine, or iodine to produce the corresponding 6 - fluoro-9α-halo-17α,21-dihydroxy-4-pregnene-3,20-dione 21-acylate. The said 9α-halo compound is then epoxidized with a mild base to give 6-fluoro-9β,11β-oxido-17α,21-dihydroxy - 4 - pregnene-3,20-dione 21-acylate. Halogenation of the said 9,11-oxido compound, the halogenating agent being one which provides a source of fluorine, chlorine or bromine, gives the corresponding 6-fluoro-9α-halo-17α-21-dihydroxy-4-pregnene-3,20-dione 21-acylate. Upon hydrolysis of the said 9α-halo 21-acylate there is produced 6-fluoro-9α-halohydrocortisone, which can be oxidized by known methods to produce 6-fluoro-9α-halocortisone. Alternatively, the 6 - fluoro-9α-halo-17α,21-dihydroxy-4-pregnene-3,20-dione 21-acylate can be oxidized to produce the 6-fluoro-9α-halocortisone 21-acylate, which can be hydrolyzed to give the 6-fluoro-9α-halocortisone.

The starting steroid for the compounds and process of the present invention is 6-fluorohydrocortisone acylate, which is prepared in accordance with the procedures of Preparations 1 through 9 herein. The preferred starting compounds containing the 17(20)-double bond have the cis configuration because they are generally convertible in higher yields in the oxidative hydroxylation step than are the trans isomers, although both are operative.

In carrying out the novel process of this invention, 6-fluorohydrocortisone acylate (I) is dehydrated to the corresponding 21-acylate of 6-fluoro-17α,21-dihydroxy-4,9-(11)-pregnadiene-3,20-dione (II) by methods known in the art, e. g., by a dehydrating agent such as phosphorous oxychloride, thionyl chloride, hydrochloric acid or sulfuric acid and acetic acid or by pyrolysis as shown in U. S. Patents 2,640,838 and 2,640,839, or the dehydration can be effected by the preferred method of reacting the 6-fluorohydrocortisone acylate with a carboxylic acid N-haloamide or N-haloimide, wherein the halogen is bromine or chloride, in an organic base together with anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of a molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time.

The thus-obtained dehydration product is converted to 6-fluoro-9α-halo-11β,17α,21-trihydroxy-4-pregnene-3,20-dione 21-acylate (III) by reaction with a hypohalous acid. The hypohalous acid is usually produced in situ by reaction of an acid with N-haloamide or N-haloimide wherein the halogen is bromine, chlorine or iodine. The 6-fluoro-17α,21-dihydroxy-4,9(11)-pregnadiene-3,20-dione 21-acylate is dissolved in an organic solvent such as methylene chloride, tertiary butyl alcohol, dioxane, tertiary amyl alcohol or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperature, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 6-fluoro-9α-halo-11β,17α,21-trihydroxy-4-pregnene-3,20-dione 21-acylate (III), in which the halogen is bromine, chlorine, or iodine, can be isolated from the reaction mixture by adding an excess of water and extracting the product with organic solvents or by recovering the precipitated compound by filtration, or the crude reaction product may be employed directly in the next step of the process.

The 9α-halo compound (III) as defined above is then epoxidized with a weak base, potassium acetate being preferred. The reaction is conducted in an inert solvent such as methanol, ethanol, acetone, dioxane, carbon tetrachloride, chloroform, and the like. The epoxidizing reaction takes place over a rather wide range of temperatures, normally from about minus fifteen degrees to the boiling point of the reaction mixture, the range between zero degrees and sixty degrees centigrade being most convenient. The reaction time may be varied considerably, depending on the temperatures employed, a period of reflux of from about eight to twenty hours producing satisfactory yields, with about eighteen hours usually being sufficient. The reaction mixture is concentrated, cooled and precipitated with water to give 6-fluoro-9β,11β-oxido-17α,21-dihydroxy-4-pregnene-3,20-dione 21-acylate (IV).

In the epoxide opening step, the 9,11-oxido compound (IV) is reacted with an acid halide such as hydrogen fluoride, hydrogen chloride or hydrogen bromide, hydrogen fluoride being preferred, to produce the corresponding 6-fluoro-9α-halo-11β,17α,21-trihydroxy-4-pregnene-3,20-dione 21-acylate. The epoxide opening and halogenation is usually conducted at temperatures between about minus forty and plus fifty degrees centigrade, the preferred limits being between about zero and 25 degrees centigrade. Advantageously, the steroid is first dissolved in an organic solvent such as tetrahydrofuran, methylene chloride, and the like. In the course of the foregoing reaction, it is possible that some hydrolysis of the 21-acylate occurs, rendering the product somewhat difficult to recover by conventional methods, such as by chromatography. It is therefore preferable at the conclusion of the epoxide opening reaction to 21-acylate the product by methods commonly employed for acylating steroids, such as by treatment with the appropriate anhydride or acid halide of an organic carboxylic acid containing from one to twelve carbon atoms, inclusive, under conventional esterifying conditions. The halogenation reaction is operative at room temperatures but is preferably conducted at lower temperatures, such as zero to minus eighty degrees centigrade, with continuous stirring. The reaction time is usually from about one to 24 hours, with one to five hours being required at room temperatures. After the reaction is complete, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 6-fluoro-9α-halo-11β,17α,21-trihydroxy-4-pregnene-3,20-dione 21-acylate (V) recovered in a purified form by recrystallization or chromatography.

The 6-fluoro-9α-halo-11β,17α,21-trihydroxy-4-pregnene-3,20-dione 21-acylate (V), wherein the halogen is fluorine, bromine, or chlorine, is then hydrolyzed to the free 21-alcohol (VI) in accordance with known methods for hydrolyzing hydrocortisone 21-esters to free hydrocortisone. A preferred procedure is to employ at least a molar equivalent of an alkali metal bicarbonate, such as potassium bicarbonate, in a substantially oxygen-free solution of a mixture of a lower alkanol, such as methanol, and water. The hydrolysis reaction is normally conducted at temperatures between about ten and thirty degrees centigrade while protecting the mixture from atmospheric oxygen, generally by bubbling nitrogen continuously through the reaction mixture. After hydrolysis is complete, the mixture is neutralized with an acid such as acetic acid, dilute hydrochloric acid, or the like, and the hydrolyzed product recovered by evaporation and crystallization, extraction with methylene chloride, or by other conventional methods.

The step of hydrolysis can be followed by re-estification of the 21-hydroxy group, as it is convenient to start with the 21-acetate as the 21-acylate and thus carry the 21-acetate through the synthesis steps. Esterification is carried out to produce the desired final 21-acylate using the appropriate anhydride or acid halide of an organic carboxylic acid containing from one to twelve carbon atoms, inclusive, preferably of a hydrocarbon carboxylic acid, under conventional 21-acylating conditions. The thus-produced 6-fluoro-9α-halo-11β,17α,21-trihydroxy-4-pregnene-3,20-dione 21-acylate can be oxidized to the 11-keto compound (VIII) as described below.

The 6-fluoro-9α-halo-11β,17α,21-trihydroxy-4-pregnene-3,20-dione (VI) can be oxidized to the corresponding 6-fluoro-9α-halo-17α,21-dihydroxy-4-pregnene-3,11,20-trione (VII) by methods which effect a selective oxidation at the 11-position, such as the procedure described in U. S. Patent 2,751,402. In accordance with the procedure therein described, selective oxidation is accomplished by reaction of the 11β-hydroxy steroid with an N-haloamide or N-haloimide such as N-bromoacetamide in a substantially nonreactive organic solvent containing an amine, preferably tertiary butyl alcohol as the solvent and pyridine as the amine.

Alternatively, the 6-fluoro-9α-halo-11β,17α,21-trihydroxy-4-pregnene-3,20-dione 21-acylate (V), instead of being hydrolyzed as indicated above, can be first oxidized to the corresponding 11-keto compound (VIII) by known methods for converting hydrocortisone acylates to cortisone acylates, such as by reaction with chromic acid. The thus-produced 6-fluoro-9α-halo-17α,21-dihydroxy-4-pregnene-3,11,20-trione 21-acylate (VIII) can then be hydrolyzed as described above for the hydrolysis of the 11β-hydroxy-21-acylated steroid to yield 6-fluoro-9α-halo-17α,21-dihydroxy-4-pregnene-3,11,20-trione (VII).

The foregoing compounds I through VIII are all characterized by the presence of a 6-fluoro substituent. It should be noted that the configuration of the fluorine at the 6-position can be either 6α or 6β. Thus substituting 6β-fluorohydrocortisone as the starting steroid (I) and following the procedures hereinbefore described and as exemplified below, while maintaining near neutral reaction conditions, there is produced as the final product of each example the corresponding 6β-epimer. Where the 6β-epimer or mixtures predominating therein is employed as the starting material, any subsequent reaction product can be isolated either as the 6β-epimer or the aforesaid mixtures of 6α- and 6β-epimers, or a 6α-epimerized product can be obtained by treatment of the 6β-epimer or mixtures of the 6α- and 6β-epimers in an essentially anhydrous liquid medium with an anhydrous mineral acid, such as hydrochloric acid, in the presence of alcohol. For the most efficient epimerization, the 6β-product should be maintained below room temperature, preferably below zero degree centigrade, during the addition of the acid. The reaction mixture can then be washed with successive portions of dilute alkali and water and dried under reduced pressure. The corresponding 6α-product can then be purified by recrystallization.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol, there was obtained pure 3-ethylene glycol ketal of methyl 3,11-diketo-5α,6α-oxido-17(20)-[cis]-pregnen-21-oate melting at 206 to 209 degrees centigrade and having an $[\alpha]_D$ of 37 degrees $(CHCl_3)$ and the following anaysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography gave two fractions: (A) 481 milligrams eluted with methylene chloride plus five percent acetone, and (B) 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

PREPARATION 3

*Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11-diketo-5α-hydroxy-6β-fluoro-17(20)-allopregnen-21-oate.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under the reduced pressure. The crude solid residue was crystallized from acetone-Skellysolve B hexanes to give 1.30 grams of $5\alpha$-$11\beta$,21 - trihydroxy - $6\beta$ - fluoro - 17(20) - allopregnen-3-one 3-ethylene ketal, melting point 197 to 205 degrees centigrade. An additional 226 milligrams was obtained from the mother liquor, melting point 175 to 185 degrees centigrade.

PREPARATION 5

*$5\alpha,11\beta$-dihydroxy-$6\beta$-fluoro-21-acetoxy-17(20)-allopregnen-3-one 3-ethylene ketal*

The acetate was prepared by allowing 0.87 gram of $5\alpha$,$11\beta$,21 - trihydroxy - $6\beta$ - fluoro - 17(20) - allopregnen-3-one 3-ethylene ketal to stand overnight in ten milliliters of acetic anhydride and ten milliliters of pyridine. The solution was then poured into ice water to give 0.92 gram of $5\alpha$,$11\beta$ - dihydroxy - $6\beta$ - fluoro - 21 - acetoxy - 17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-esters of $5\alpha,11\beta$,21-trihydroxy-$6\beta$-fluoro-17(20)-allopregnen-3-one 3-ethylene ketals can be prepared wherein the 21-acyl radical is that of a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, $\alpha$-ethylisovaleric, propiolic, undecylenic, succinic, crotonic, maleic, a cyclic acid, e. g., cyclopropylideneacetic, cyclopentylformic, cyclopentylacetic, $\beta$-cyclohexylpropionic, cyclohexylformic, cyclohexylacetic, $\beta$-cyclohexylpropionic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, $\alpha$-naphthoic, 3-methyl-$\alpha$-naphthoic, an aralkyl acid, e. g., phenylacetic, phenylpropionic, diphenylacetic, triphenylacetic, cinnamic, etc., by contacting $5\alpha$,$11\beta$,21-trihydroxy-$6\beta$-fluoro-17(20)-pregnen-3-one 3-ethylene ketal with the appropriate acylating agent, e. g., the anhydride or acid halide of the selected acid in a solvent such as benzene, toluene, acetic acid, or the like. A convenient method for preparing the 21-formyloxy ester consists in contacting $5\alpha$,$11\beta$,21-trihydroxy-$6\beta$-fluoro-17(20)-pregnen-3-one 3-ethylene ketal with formic acid in the presence of para-toluenesulfonic acid.

PREPARATION 6

*$5\alpha,11\beta,17\alpha$-trihydroxy-$6\beta$-fluoro-21-acetoxy-allopregnane-3,20-dione 3-ethylene ketal*

To a solution of 0.77 gram of $5\alpha$,$11\beta$-dihydroxy-$6\beta$-fluoro-21-acetoxy-17(20)-allopregnen - 3 - one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams of osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. This residue was crystallized from acetone-Skellysolve B hexanes to give 0.47 gram of $5\alpha$,$11\beta$,$17\alpha$-trihydroxy - $6\beta$ - fluoro - 21 - acetoxyallo-pregnane-3,20-dione 3-ethylene ketal, melting point 220 to 228 degrees centigrade.

PREPARATION 7

*$5\alpha,11\beta,17\alpha$-trihydroxy-$6\beta$-fluoro-21-acetoxy-allopregnane-3,20-dione*

A solution of 0.47 gram of $5\alpha$,$11\beta$,$17\alpha$-trihydroxy-$6\beta$-fluoro - 21 - acetoxyallopregnane - 3,20 - dione 3 - ethylene ketal in 35 milliliters of acetone and four milliliters of 1 N sulfuric acid solution was gently boiled on a steam bath for ten minutes, cooled and neutralized with dilute sodium bicarbonate solution. Addition of water followed by cooling gave 0.33 gram of $5\alpha$,$11\beta$,$17\alpha$-trihydroxy-$6\beta$-fluoro-21-acetoxyallopregnane-3,20-dione, melting point 230 to 240 degrees centigrade.

PREPARATION 8

*$6\beta$-fluoro-$11\beta$,$17\alpha$-dihydroxy-21-acetoxy-4-pregnene-3,20-dione ($6\beta$-fluorohydrocortisone acetate)*

A solution of 100 milligrams of $5\alpha$,$11\beta$,$17\alpha$-trihydroxy-$6\beta$-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of $6\beta$-fluoro-$11\beta$,$17\alpha$-dihydroxy-21-acetoxy-4-pregnene-3,20-dione ($6\beta$-fluorohydrocortisone acetate), melting point 210 to 218 degrees centigrade. Infrared data and ultraviolet data were in agreement with the structure.

PREPARATION 9

*$6\alpha$-fluoro-$11\beta$,$17\alpha$-dihydroxy-21-acetoxy-4-pregnene-3,20-dione ($6\alpha$-fluorohydrocortisone acetate)*

A solution of 0.132 gram of $6\beta$-fluoro-$11\beta$,$17\alpha$-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2.5 hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, $6\alpha$-fluoro-$11\beta$,$17\alpha$-dihydroxy-21-acetoxy-4-pregnene-3,20-dione, which melted at 203 to 210 degrees centigrade.

Substitution of other 21-esters of $5\alpha$-$11\beta$,21-trihydroxy-$6\beta$ - fluoro - 17(20) - allopregnen-3-one 3-alkylene ketals, such as those in Preparation 5, in the procedure of Preparation 6 and then following the procedure of Preparations 7 and 8 is productive of $6\beta$-fluorohydrocortisone acylate wherein the acyl radical is that disclosed in Preparation 5. The $6\alpha$-epimer of these acylates can readily be prepared by the above procedure.

EXAMPLE 1

*$6\alpha$-fluoro-$17\alpha$,21-dihydroxy-4,9(11)pregnadiene-3,20-dione 21-acetate (II)*

To a solution of one gram of $6\alpha$-fluorohydrocortisone acetate (I) in ten milliliters of pyridine was added 0.4 gram of N-bromoacetamide. The mixture was allowed to stand under nitrogen for twenty minutes, at which time it was cooled to five degrees centigrade. While stirring, anhydrous sulfur dioxide was passed over the surface until the solution gave no color change with acidified starch-iodide paper. The temperature of the reaction mixture was not allowed to go above twenty degrees centigrade during the sulfur dioxide addition. The mixture was then allowed to stand for five minutes and was poured into 100 milliliters of ice-water, resulting in precipitation of 915 milligrams of crude solid, melting point 190 to 202 degrees centigrade. Crystallization from acetone gave 511 milligrams of 6α-fluoro-17α,21-dihydroxy-4,9(11)-pregnadiene-3,20-dione 21-acetate (II), melting point 214 to 218 degrees centigrade. The analytical sample melted at 220 to 222 degrees centigrade. Analysis gave $[α]_D$ plus 73 degrees (acetone) and the following:

Analysis.—Calcd. for $C_{23}H_{29}O_5$: C, 68.30; H, 7.23; F, 4.70. Found: C, 68.77; H, 7.57; F, 4.77.

EXAMPLE 2

6α - fluoro - 9α-bromo-11β,17α,21-trihydroxy-4-pregnene-3,20-dione 21-acetate (6α-fluoro-9α-bromohydrocortisone acetate) (III)

To a solution of 420 milligrams of 6α-fluoro-17α,21-dihydroxy-4,9(11)-pregnadiene-3,20-dione 21-acetate (II) in 6.5 milliliters of methylene chloride was added 12.5 milliliters of tertiary butyl alcohol, a solution of 1.0 milliliter of 72 percent perchloric acid in 75 milliliters of water, and a solution of 182 milligrams of N-bromoacetamide in 3.2 milliliters of tertiary butyl alcohol. After stirring for fifteen minutes, a solution of 182 milligrams of sodium sulfite in ten milliliters of water was added and the mixture concentrated under reduced pressure at sixty degrees centigrade until crystallization occurred. After cooling in an ice bath, thirty milliliters of water was added with stirring. The crystalline product was filtered, washed with water and dried, giving a yield of 480 milligrams of essentially pure 6α-fluoro-9α-bromo-11β,17α,21 - trihydroxy-4-pregnene-3,20-dione 21-acetate (III), melting point 163 to 166 degrees centigrade (with decomposition). The product was used in the succeeding example without further purification.

Substitution of another N-haloamide or an N-haloimide such as N-iodoscuccinimide or N-chlorosuccinimide for the N-bromoacetamide in the foregoing reaction is productive of the corresponding 9α-halo product.

EXAMPLE 3

6α-fluoro-9β,11β-oxido-17α,21-dihydroxy-4-pregnene-3,20-dione 21-acetate (IV)

A mixture of 2.816 grams of 6α-fluoro-9α-bromo-11β,17α,21-trihydroxy-4-pregnene-3,20-dione 21-acetate (6α-fluoro-9α-bromohydrocortisone acetate) (III), from Example 2, 2.816 grams of potassium acetate, and ninety milliliters of acetone was stirred and heated at reflux temperature for eighteen hours. The reaction mixture was then concentrated to about one-half the original volume and cooled in an ice bath. Addition of 250 milliliters of water gave 2.264 grams of 6α-fluoro-9β,11β-oxido-17α,21-dihydroxy-4-pregnene-3,20-dione 21-acetate (IV), melting point 195 to 200 degrees centigrade with decomposition. The analytical sample, recrystallized from acetone, melted at 197 to 200 degrees centigrade. Analysis gave $[α]_D$ plus 28 degrees (acetone) and the following:

Analysis.—Calcd. for $C_{23}H_{29}O_6F$: C, 65.70; H, 6.95; F, 4.52. Found: C, 65.76; H, 7.03; F, 4.24.

EXAMPLE 4

6α,9α - difluoro - 11β,17α,21 - trihydroxy - 4 - pregnene-3,20-dione 21-acetate (6α,9α-difluorohydrocortisone acetate) (V)

To 3.41 grams of liquid hydrogen fluoride cooled in Dry-Ice bath was added, portion-wise, a slurry of 1.875 grams of 6α-fluoro-9β,11β-oxido-17α,21-dihydroxy-4-pregnene-3,20-dione 21-acetate (IV) in 5.97 grams of tetrahydrofuran (distilled over sodium hydroxide) and twenty milliliters of methylene chloride which had similarly been cooled in a Dry-Ice bath. The steroid dissolved completely. After standing at zero to five degrees centigrade for seventeen hours, the reaction mixture was poured slowly into a stirred mixture of 300 milliliters ice-water, fifty milliliters of methylene chloride, and twenty grams of sodium bicarbonate. The mixture was stirred for a few minutes, the methylene chloride layer was separated and the water phase extracted with two fifty-milliliter portions of fresh methylene chloride. The combined methylene chloride solutions were washed with water and dried. Attempts to crystallize the product by addition of Skellysolve B hexanes gave only oil. The oil was again dissolved by addition of methylene chloride and chromatographed over synthetic magnesium silicate. One long fraction of 1.496 grams of crystalline product came down from the column, which according to the papergram consisted of four materials in the ratio of 5:25:65:5.

All of the crystallization fractions were combined and the whole column fraction was acetylated overnight with ten milliliters of acetic anhydride in ten milliliters of pyridine. The acetylation mixture was poured into ice-water and extracted with methylene chloride. The extract was washed with dilute acid, dilute base, water, dried and put over a synthetic magnesium silicate column. A papergram of this crude material showed two spots in the ratio of 20:80. The fraction weighing 1.075 grams, eluted from the column with fifteen and twenty percent acetone in Skellysolve B hexanes, was recrystallized several times and gave 180 milligrams of constant melting product, 6α,9α-difluorohydrocortisone acetate, melting point 220 to 225 degrees centigrade. Analysis gave $[α]_D$ plus 115 degrees (acetone) and the following:

Analysis.—Calcd. for $C_{23}H_{30}O_6F_2$: C, 62.71; H, 6.87; F, 8.63. Found: C, 62.85; H, 7.22; F, 8.67.

Substitution of aqueous hydrogen chloride or hydrogen bromide for the hydrogen fluoride above is productive of the corresponding 9α-halo product.

Substitution in the procedure of Example 1 of other 21-esters of 6α- or 6β-fluorohydrocortisone, such as those enumerated in Preparation 5, followed by the procedure of Examples 2 through 4, is productive of the corresponding 21-esters of 6,9α-difluorohydrocortisone, 6-fluoro-9α-chlorohydrocortisone, or 6-fluoro-9α-bromohydrocortisone, wherein the 6-fluoro substituent is the 6α- or 6β-epimer.

EXAMPLE 5

6α,9α - difluoro - 11β,17α,21 - trihydroxy - 4 - pregnene-3,20-dione (6α,9α-difluorohydrocortisone) (VI)

Nitrogen was bubbled through a solution of 0.33 gram of 6α,9α-difluoro-11β,17α,21-trihydroxy-4-pregnene-3,20-dione 21-acetate (6α,9α-difluorohydrocortisone acetate) (V) in 33 milliliters of methanol for fifteen minutes. To this was added a solution of 0.33 gram of potassium bicarbonate in four milliliters of water, likewise treated with nitrogen. After stirring under nitrogen for five hours, the base was neutralized by the addition of 2.5 milliliters of five percent hydrochloric acid. The mixture was then concentrated under reduced pressure at fifty degrees centigrade to about five milliliters. The residue was taken up in ethyl acetate, washed, dried and evaporated to dryness. Crystallization from acetone-Skellysolve B hexanes yielded 0.27 gram of 6α,9α-difluoro-11β,17α,21-trihydroxy-4-pregnene-3,20-dione (6α,9α-difluorohydrocortisone) (VI), melting point 210 to 218 degrees centigrade. The analytical sample melted at 214 to 217 degrees centigrade. Analysis gave $[α]_D$ plus 115 degrees (acetone) and the following:

Analysis.—Calcd. for $C_{21}H_{28}O_5F_2$: C, 63.30; H, 7.08; F, 9.54. Found: C, 63.60; H, 7.39; F, 8.48.

Substitution of the corresponding 9α-chloro or 9α-bromo product in the above hydrolysis is productive of 6α-fluoro-9α-chlorohydrocortisone or its 9α-bromo analogue.

The 6α,9α-difluorohydrocortisone of this example or its 9α-chloro or 9α-bromo analogues can be re-esterified at the 21-hydroxyl group with the anhydride or acid halide of an organic carboxylic acid containing from one to twelve carbon atoms as previously disclosed. The resulting 6α,9α-difluorohydrocortisone acylate or its 9α-chloro or 9α-bromo analogues can be oxidized using the procedure shown in Examples 6 and 7 to produce the corresponding 6α,9α-difluorocortisone acylate, 6α-fluoro-9α-chlorocortisone acylate, or 6α-fluoro-9α-bromocortisone acylate, respectively.

EXAMPLE 6

6α,9α - difluoro - 17α,21 - dihydroxy - 4 - pregnene-3,11,20-trione (6α,9α-difluorocortisone) (VII)

To a solution of 0.5 gram of 6α,9α-difluoro-11β,17α,21-trihydroxy-4-pregnene-3,20-dione (VI) and one milliliter of pyridine in 35 milliliters of tertiary butyl alcohol was added 250 milligrams of N-bromoacetamide. After maintaining at room temperature for sixteen hours, the reaction mixture was diluted with 25 milliliters of water containing 250 milligrams of sodium sulfite and concentrated to about twenty milliliters, at which point precipitation occurred. The thus-obtained precipitate was collected on a filter and recrystallized three times from ethyl acetate and Skellysolve B hexanes to give 6α,9α-difluoro - 17α,21 - dihydroxy - 4 - pregnene - 3,11,20-trione (VII).

Substitution of the corresponding 9α-chloro or 9α-bromo product in the above oxidation gives 6α-fluoro-9α-chlorocortisone or its 9α-bromo analogue.

EXAMPLE 7

6α,9α - difluoro - 17α,21 - dihydroxy - 4 - pregnene-3,11,20-trione acetate (6α,9α-difluorocortisone acetate) (VIII)

A solution is prepared containing 0.5 grams of 6α,9α-difluoro-11β,17α,21-trihydroxy-4-pregnene-3,20-dione 21-acetate (V), 0.15 gram of chromium trioxide, ten milliliters of glacial acetic acid and one-half milliliter of water. This mixture is stirred and maintained at room temperature for eight hours, after which the reaction is terminated by addition of methanol. Thereafter, the mixture is poured into fifty milliliters of ice water and the thus-obtained precipitate collected on a filter and recrystallized three times from ethyl acetate and Skellysolve B hexanes to give 6α,9α-difluoro-17α,21-dihydroxy-4-pregnene-3,11,20-trione 21-acetate (VIII).

Substitution of the corresponding 9α-chloro or 9α-bromo starting steroid in the above reaction produces 6α-fluoro-9α-chlorocortisone acetate or its 9α-bromo analogue.

EXAMPLE 8

6α,9α - difluoro - 17α,21 - dihydroxy - 4 - pregnene-3,11,20-trione (6α,9α-difluorocortisone) (VII)

Following the procedure of Example 5 but substituting 6α,9α-difluorocortisone acetate (VIII) as the starting material therein is productive of 6α,9α-difluorocortisone (VII).

Similarly, substituting 6α-fluoro-9α-chlorocortisone acetate or its 9α-bromo analogue in the above hydrolysis gives 6α-fluoro-9α-chlorocortisone or 6α-fluoro-9α-bromocortisone.

EXAMPLE 9

6β,9α-difluoro-17α,21-dihydroxy-4-pregnene-3,11,20-trione (6β,9α-difluorocortisone) (VIII)

Substituting 6β-fluorohydrocortisone acetate from Preparation 8 for the starting material in Example 1 and following the procedures of Examples 1 through 8, but maintaining near neutral reaction conditions, there is produced as the final product of each example the corresponding 6β-steroid, giving ultimately in Example 8 the 6β,9α-difluorocortisone, 6β-fluoro-9α-chlorocortisone or 6β-fluoro-9α-bromocortisone.

This application is a continuation-in-part of copending application Serial Number 634,828, filed January 18, 1957, which in turn is a continuation-in-part of copending application Serial Number 519,632, filed July 1, 1955.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:
1. A compound of the following formula:

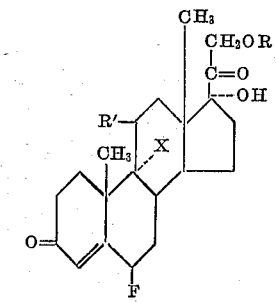

wherein R is a member selected from the group consisting of hydrogen and the acyl radical of a hydrocarbon carboxylic acid containing from one to twelve carbon atoms, inclusive, R' is a member selected from the group consisting of hydroxy and keto, and X is halogen.

2. A compound of claim 1 in which the 6-fluoro group is 6α-fluoro.

3. 6α-fluoro-9α-halohydrocortisone 21-acylate, wherein the acyl group is that of a hydrocarbon carboxylic acid containing from one to twelve carbon atoms, inclusive.

4. 6α,9α-difluorohydrocortisone.
5. 6α,9α-difluorohydrocortisone acetate.
6. 6α-fluoro-9α-bromohydrocortisone.
7. 6α-fluoro-9α-halocortisone 21-acylate, wherein the acyl group is that of a hydrocarbon carboxylic acid containing from one to twelve carbon atoms, inclusive.
8. 6α,9α-difluorocortisone.
9. 6α,9α-difluorocortisone acetate.
10. A compound of the following formula:

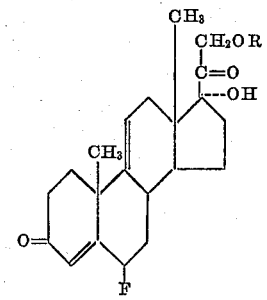

wherein R is a member selected from the group consisting of hydrogen and the acyl radical of a hydrocarbon carboxylic acid containing from one to twelve carbon atoms, inclusive.

11. 6α - fluoro - 17α,21 - dihydroxy - 4,9(11) - pregnadiene-3,20-dione,

12. A compound of the following formula:

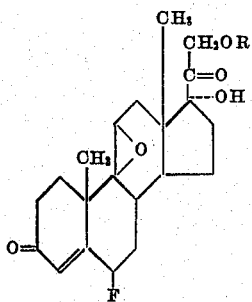

wherein R is a member selected from the group consisting of hydrogen and the acyl radical of a hydrocarbon carboxylic acid containing from one to twelve carbon atoms, inclusive.

13. 6α - fluoro - 17α,21 - dihydroxy - 9β,11β - oxido - 4-pregnene-3,20-dione.

14. A process for the production of a compound of the following formula:

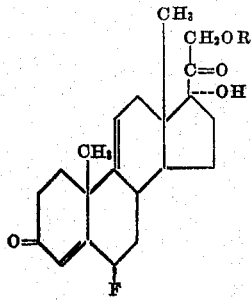

wherein R is a member selected from the group consisting of hydrogen and the acyl radical of an organic carboxylic acid containing from one to twelve carbon atoms, inclusive, which comprises dehydrating 6-fluorohydrocortisone 21-acylate, wherein the acyl radical is defined as above.

15. A process for the production of a compound of the following formula:

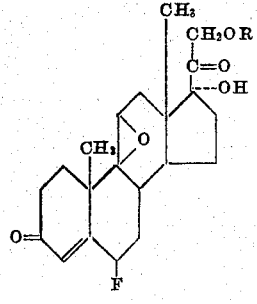

wherein R is a member selected from the group consisting of hydrogen and the acyl radical of an organic carboxylic acid containing from one to twelve carbon atoms, inclusive, which comprises: reacting 6-fluoro-17α,21-dihydroxy-4,9(11)-pregnadiene-3,20-dione 21-acylate with a source of hypohalous acid wherein the halogen of the said acid is a member selected from the group consisting of bromine, chlorine and iodine to obtain the corresponding 6-fluoro-9α-halo-11β,17α,21-trihydroxy-4-pregnene-3,20-dione 21-acylate, and epoxidizing the said 9α-halo compound with a mild base.

16. A process for the production of a compound of the following formula:

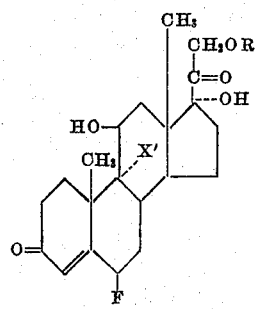

wherein R is a member selected from the group consisting of hydrogen and the acyl radical of an organic carboxylic acid containing from one to twelve carbon atoms, inclusive, and X' is a member selected from the group consisting of fluorine, chlorine and bromine, which comprises: reacting 6-fluoro-9β,11β-oxido-17α,21-dihydroxy-4-pregnene-3,20-dione 21-acylate, wherein the acyl group is defined as above, with a halogenating agent providing a source of a halogen selected from the group consisting of fluorine, chlorine and bromine.

17. The process of claim 16 wherein the 6-fluoro substituent is 6α-fluoro.

18. The process of claim 17 wherein the halogenating agent is hydrogen fluoride.

19. A process for the production of a compound of the following formula:

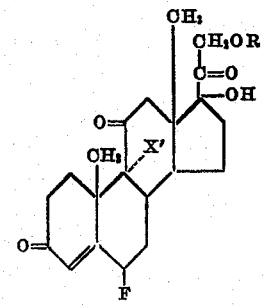

wherein R is a member selected from the group consisting of hydrogen and the acyl radical of an organic carboxylic acid containing from one to twelve carbon atoms, inclusive, and X' is a member selected from the group consisting of fluorine, chlorine and bromine, which comprises: oxidizing 6-fluoro-9α-halo-11β,17α,21-trihydroxy-4-pregnene-3,20-dione 21-acylate, wherein the halo and acyl substituents are defined as above.

20. The process of claim 19 wherein the 6-fluoro substituent is 6α-fluoro.

21. A process for the production of 6-fluoro-9α-halohydrocortisone which comprises reacting a 6-fluoro-9α-halohydrocortisone 21-acylate with a hydrolyzing agent.

22. A process for the production of 6α,9α-difluorohydrocortisone which comprises reacting a 6α,9α-difluorohydrocortisone 21-acylate with an alkali metal bicarbonate hydrolyzing agent.

23. A process for the production of 6-fluoro-9α-halocortisone which comprises reacting a 6-fluoro-9α-halocortisone 21-acylate with a hydrolyzing agent.

24. A process for the production of 6α,9α-difluorocortisone which comprises hydrolyzing a 6α,9α-difluorocortisone 21-acylate with an alkali metal bicarbonate.

References Cited in the file of this patent
UNITED STATES PATENTS 2,816,902    Gould et al. _____ Dec. 17, 1957